3,130,002
SODIUM PHOSPHATE GLASSES
Robert J. Fuchs, Clark, N.J., assignor to FMC Corporation, New York, N.Y., a corporation of Delaware
No Drawing. Filed Oct. 5, 1961, Ser. No. 143,056
3 Claims. (Cl. 21—2.7)

The present invention relates to a novel class of sodium polyphosphate glasses having metal-corrosion inhibiting properties when applied in aqueous solutions and more particularly, to a class or sodium polyphosphate glasses which have improved stability against reversion to orthophosphates.

Polyphosphate glasses are currently used to treat water because of their ability to inhibit corrosion of metals in contact with aqueous solutions. Polyphosphate glasses are produced by condensing molecules of sodium orthophosphate to form long-chained molecules having P—O—P bonds. The condensation is carried out by driving off molecular water at high temperatures from the appropriate orthophosphate salts. The average number of sodium orthophosphate molecules which have been condensed into one polyphosphate molecule is expressed as the mole ratio of $$\frac{(Na_2O+H_2O)}{P_2O_5}$$

This ratio decreases with increased number of orthophosphate atoms in the molecule. The two terminal groups at each end of the polyphosphate chains are predominantly ONa, with some OH groups being present in minor amounts.

Commercially prepared phosphate glasses are prepared with $$\frac{(Na_2O+H_2O)}{P_2O_5}$$

mole ratios of 1.33 to 1.14. Those having ratios above 1.2 have good dispersing properties and are generally used in food applications. However, they are not normally suitable in water treatment. The common commercial phosphate glasses used in water treatment contain about 67 to 67.5% $P_2O_5$ and have $$\frac{(Na_2O+H_2O)}{P_2O_5}$$

mole ratios of 1.2 to 1.14. These polyphosphate glasses have the following formulation:

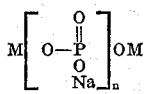

where $n=10$ to 14 and M=Na or H, with Na being present in major molar amounts.

These polyphosphate glasses are commonly used in aqueous solutions to inhibit corrosion of metals in contact with aqueous solutions or to inhibit hard water scale and to simultaneously soften the water. This latter function is carried out by sequestering the metal ions present in an aqueous system in the form of soluble complexes of the offending ions, thereby preventing them from deleteriously affecting the aqueous system.

One of the problems that has arisen with the use of glassy polyphosphates is the reversion of these polyphosphates to the orthophosphate form. This is particularly true where the aqueous system containing the glassy phosphate is heated to high temperatures. This is most serious since the corrosion inhibiting power and the calcium sequestering value of the glassy phosphate are lost upon reversion of glassy phosphates to the orthophosphate form. Additionally, the non-sequestered hard water ions present in the aqueous system form orthophosphate precipitates which eventually form a scale on the interior walls of the aqueous carrying conduits. In those applications where the water is being used for heat exchange as in boilers, condensers, and coolers, the orthophosphate precipitate seriously interferes with the heat transfer of the equipment. As a result, there has been a serious need for phosphates having both high metal corrosion inhibiting properties in aqueous solution and improved resistance to reversion.

It is an object of the present invention to produce a long-chain sodium phosphate glass which has high metal corrosion inhibiting properties in aqueous solution and which resists reversion to the orthophosphate form.

These and other objects will become apparent in the following description of the invention.

It has been found unexpectedly that sodium polyphosphate glasses having an average mole ratio of $$\frac{(Na_2O+H_2O)}{P_2O_5}$$

of about 1.10 to 1.067, a weight percent $P_2O_5$ of about 68.5 to 69.7%, and possessing terminal groups on the polyphosphate chain having no less than about 75 mole percent OH with the remainder being ONa, are highly resistant to reversion to sodium orthophosphate while still possessing high corrosion inhibition properties and calcium sequestering abilities in aqueous systems.

This is quite surprising since polyphosphate glasses having $$\frac{(Na_2O+H_2O)}{P_2O_5}$$

mole ratios below about 1.067 do not possess the desirable corrosion inhibiting properties which the present polyphosphate glasses exhibit. One such polyphosphate glass having a $$\frac{(Na_2O+H_2O)}{P_2O_5}$$

mole ratio of 1.029 and a weight percent $P_2O_5$ of 69.0 permits twenty times the corrosion obtained when using the present polyphosphate glasses.

The present polyphosphate glasses have the following formulation:

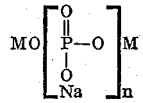

when $n=$about 20 to 30 and M=at least about 75 mole percent H, with the remainder being Na.

These compounds have been found to have marked superiority over polyphosphate glasses with higher $$\frac{(Na_2O+H_2O)}{P_2O_5}$$

mole ratios because they do not revert readily to sodium orthophosphate. These glassy polyphosphates have particular application in aqueous systems where the water is heated to high temperatures. Examples of such systems are recycle water-cooled condensers in which the water removes heat from the condensed liquids, and tubular heaters employing circulating water as the heating medium.

The preparation of the present sodium phosphate glasses is carried out by chemical reaction of a basic inorganic sodium compound and a simple acidic phosphate. The sodium-containing compound should be one that provides a volatile anion such as the hydroxide, carbonate, etc. The acidic phosphate should provide a volatile cation as do ammonium mono- or di-hydrogen phosphate, phosphoric acid, etc. After adjustment of sodium to phosphorus ratio in the reaction mass, it is heated to temperatures in excess of about 600° C., resulting in a clear, transparent molten mass. This molten mass is rapidly chilled by well-known means. For example, the molten mass may be poured onto cold surfaces such as water-cooled pans or trays. This solidified mass is crushed or ground to a desired size and packed in air-tight containers.

The weight percent of $P_2O_5$ in the present polyphosphate glasses varies from about 68.5 to 69.7%. At a $P_2O_5$ weight percent of 68.5% the ratio of $$\frac{(Na_2O+H_2O)}{P_2O_5}$$

is fixed at about 1.10. As the weight percent $P_2O_5$ increases, the mole ratio of $$\frac{(Na_2O+H_2O)}{P_2O_5}$$

decreases so that at a weight percent $P_2O_5$ of between 69.0 and 69.7% the mole ratio of $$\frac{(Na_2O+H_2O)}{P_2O_5}$$

is about 1.067.

The exact weight percent $P_2O_5$ at any given $$\frac{(Na_2O+H_2O)}{P_2O_5}$$

ratio in the present polyphosphate glasses depends upon the ratio of $Na_2O$ to $H_2O$ in the molecule. The term $H_2O$ refers to the hydrogen atoms, expressed as $H_2O$, which are present at each terminal end of the polyphosphate chain. As these hydrogen atoms are replaced with sodium atoms, the weight percent $P_2O_5$ of the polyphosphate molecule decreases. Since the number of terminally located sodium atoms which can be present in the instant polyphosphate molecules is limited to about 25 mole percent of the total terminal groups, this limits the $P_2O_5$ weight percent which can be present in a polyphosphate glass having a given $$\frac{(H_2O+Na_2O)}{P_2O_5}$$

mole ratio.

It is desirable to have a very limited number of terminally located ONa groups in order to prevent the glassy polyphosphate from yielding too acid a solution in those applications where overly acid aqueous mediums are undesirable. Where the present polyphosphate glasses have only terminal OH groups with no ONa groups, aqueous solutions of these glasses have a pH of about 4.5. These low pH glasses are desirable where the system is to be employed under slightly acid conditions. By replacing a limited number of terminal OH groups of the polyphosphate glass with ONa groups, the acidity is decreased, making these glasses more suitable for neutral or slightly alkaline systems. In any event, all the polyphosphate glasses having terminal groups made up of no less than about 75 mole percent OH groups with the remainder being ONa groups have been found to be highly resistant to reversion to sodium orthophosphate, while still possessing the capacity to inhibit corrosion of metal in contact with the aqueous systems.

An ancillary advantage obtained by decreasing the reversion of these glasses, is that their calcium sequestering ability remains at relatively high levels. In contrast where severe reversion takes place, as in the prior commercial polyphosphate glasses, the calcium sequestering value falls off sharply and remains at undesirably low levels. The present polyphosphate glasses show on the order of three to over four times the sequestering value of commercial glasses after both have been exposed to high temperatures for an identical period of time.

The present sodium polyphosphate glasses are employed in water solutions in amounts of about 1 part per million to about 40 parts per million. At these concentrations, the phosphate glasses have been found to be effective in inhibiting corrosion of metals in contact with the aqueous system. Larger amounts can be employed where unusually hard water is encountered.

The sodium polyphosphate glasses can be employed in amounts of from 100 parts/million to as high as 5% when they are being added to soften extremely hard water by sequestering metal ions such as magnesium and calcium. In this application, the metal ions are bound in a soluble complex rendering them innocuous in the aqueous solution. This softening treatment prevents metal ions from interfering in chemical reactions when the aqueous solution is used in chemical treating operations, i.e., bleaching of textiles, forming detergent formulations, etc. The following examples are presented by the way of illustration only and are not deemed to be limitative of the present process.

EXAMPLE I

Phosphorus was burned to $P_2O_5$ in a wetted-wall type furnace of the type described in U.S. Patent No. 2,708,620, issued to Henry S. Winnicki on May 17, 1955. The $P_2O_5$ was absorbed in an aqueous solution of $Na_2HPO_4$. Sodium carbonate was added to the solution to adjust the ratio of monosodium phosphate to di-sodium phosphate in the solution as required. The mole ratio of $$\frac{NaH_2PO_4}{Na_2HPO_4}$$

was fixed at 99/1. The density of the solution was maintained at 59° Baumé. The solution was maintained at a temperature of about 100° C. during which the reaction went to completion and $CO_2$ was liberated. The reaction solution was fed to a furnace at a rate of 1170 lbs./hour and heated to a temperature of about 650° C., during which most of the water was driven off. The resultant clear, transparent molten mass was then quickly chilled to a clear glass which fractured into relatively small pieces. The particulate glass product was labeled Glass A, stored in air-tight containers, and permitted to cool.

The weight percent $P_2O_5$, chain length, and $$\frac{(Na_2O+H_2O)}{P_2O_5}$$

ratio are given in Table I.

A second batch of polyphosphate glass was produced in the same manner as described above, except that the $P_2O_5$ was absorbed in a phosphoric acid solution. The mole ratio of $$\frac{NaH_2PO_4}{H_3PO_4}$$

was maintained at 58/1 by the addition of sodium carbonate. The density of the solution fed to the furnace was 59° Baumé. The resultant particulate glass product was labeled Glass B, stored in air-tight containers and permitted to cool. The weight percent $P_2O_5$, and $$\frac{(Na_2O+H_2O)}{P_2O_5}$$

ratio are given in Table I.

EXAMPLE II

The two glasses made in Example I called Glass A and Glass B were compared with a typical commercial product for their calcium sequestering ability. This was done by making up solutions containing 1% of the respective glasses in distilled water, adjusting the pH to 6.5 and boiling under reflux at 100° C. for three hours. At the end of the three hour test, the solutions were tested for calcium sequestering power by the method of Hafford et al., which is described in "Ind. Eng. Chem., Anal. Ed., 18, page 411 (1946)." The orthophosphate content of the solutions was also determined by ASTM method D501–58T (1958, part 10, page 831). Calcium values are expressed as grams of calcium sequestered per 100 grams of glass.

Table I

| Sample | Wt. percent P$_2$O$_5$ | $\frac{(Na_2O+H_2O)}{P_2O_5}$ (mole ratio) | Mole Percent OH on Terminal Groups | Reversion (Percent ortho) | Percent Improvement over Comm. Glass C | Calcium Sequestering Value | |
|---|---|---|---|---|---|---|---|
| | | | | | | Before | After |
| Comm. Glass C | 67.6 | 1.15 | 35 | 36 | ------ | 14 | 2 |
| Glass A | 68.7 | 1.10 | 81 | 26 | 28 | 16 | 6 |
| Glass B | 69.7 | 1.067 | 100 | 25 | 31 | 16 | 9 |

EXAMPLE III

The two glasses made in Example I called Glass A and Glass B were compared with typical commercial products for their rates of reversion to orthophosphate. This was done by making up solutions containing 100 parts/million of their respective glass in distilled water, adjusting the pH to 6.5 and boiling under reflux at 100° C. for three hours. The orthophosphate content of the solutions were determined analytically after three hours in the same manner as Example II. The results which were obtained are given in Table II.

Table II

| Sample | Wt. Percent P$_2$O$_5$ | $\frac{(Na_2O+H_2O)}{P_2O_5}$ (Mole Ratio) | Mole Percent OH on Terminal Groups | Reversion (Percent ortho) | Percent Improvement Over Comm. Glass C |
|---|---|---|---|---|---|
| Glass A | 68.7 | 1.10 | 81 | 34 | 24 |
| Glass B | 69.7 | 1.067 | 100 | 33 | 27 |
| Comm. Glass C | 67.6 | 1.15 | 35 | 45 | ------ |
| Comm. Glass D | 67.7 | 1.15 | 35 | 46 | ------ |
| Comm. Glass E | 67.6 | 1.20 | 50 | 50 | ------ |
| Comm. Glass F | 67.7 | 1.14 | 30 | 45 | ------ |

EXAMPLE IV

Hot-rolled mild steel test strips were washed with detergent solutions, rinsed, dried, degreased with acetone, pickled for one hour in 10% hydrochloric acid, rinsed, brushed with a soft brush, rinsed with distilled water, dipped in acetone, and allowed to air dry. One side and the edges of each strip were coated with clear nail enamel and the strips were then dried in a desiccator and weighed. One liter of tap water containing 40 parts/million of a sample glass was placed in a two-liter beaker and the pH of the solution adjusted to 6.0. The test strips were placed in the beaker exposed side up and the solution agitated with a four-vaned glass stirrer at 450 r.p.m. At the end of three days, the test strips were removed, washed with tap water, rinsed with distilled water, wiped dry, dried in a desiccator and weighed. This procedure was carried out with solutions of the various samples listed in Table III, as well as a "blank" tap water solution containing no added glass. The loss in weight of the test strips was converted to surface corrosion rate in terms of mils per year (m.p.y.). The results of duplicate tests are given in Table III.

Table III

| Sample | Wt. Percent P$_2$O$_5$ | $\frac{(Na_2O+H_2O)}{P_2O_5}$ (Mole Ratio) | Corrosion, m.p.y. | |
|---|---|---|---|---|
| | | | Run A | Run B |
| Comm. Glass C | 67.6 | 1.15 | 0.5 | 0.9 |
| Glass A | 68.7 | 1.10 | 0.7 | 0.6 |
| Glass B | 69.7 | 1.067 | 0.9 | 1.2 |
| Comm. Glass X | 69.0 | 1.029 | 21 | 20 |
| "Blank" | ------ | ------ | 56 | 53 |

The results of Example II as tabulated in Table I clearly show the improved resistance to reversion which the present glasses possess. The "percent improvement over commercial glass," as reported in Table I, indicates 28 to 31% less orthophosphate is produced by the present glasses compared with commercial glasses. The calcium sequestering values, given in Table I, show that the commercial glasses initially have somewhat equal sequestering power as the present glasses. However, upon treatment at higher temperatures which accelerate reversion, the present polyphosphate glasses have 3 to 4½ times the calcium sequestering power of the commercial preparation.

The results of Example IV, as reported in Table III, demonstrate the corrosion inhibiting power of the present glasses. Additionally, Table III points out the serious increase in corrosion which is obtained with polyphosphate glasses having mole ratios of $$\frac{(Na_2O+H_2O)}{P_2O_5}$$

below 1.067. In this case Comm. Glass C, Glass A, and Glass B all had corrosion rates of about the same order of magnitude, whereas commercial Glass X, with a mole ratio of $$\frac{(Na_2O+H_2O)}{P_2O_5}$$

of 1.029, showed corrosion rates twenty times as great. Such corrosion rates are beyond acceptable limits and show lack of material corrosion inhibiting properties by commercial Glass X.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. The method of inhibiting the corrosion of metal in contact with water which comprises adding to said water a sodium polyphosphate glass having improved resistance against reversion to sodium orthophosphate, said sodium polyphosphate glass having a mole ratio of $$\frac{(Na_2O+H_2O)}{P_2O_5}$$

of 1.10 to 1.065, a weight percent P$_2$O$_5$ of 68.5 to 69.7%, and possessing terminal groups on the polyphosphate chain having no less than 75 mole percent OH with the remainder being ONa groups.

2. The process of claim 1 in which the sodium polyphosphate glass is added to said water in amounts of from about 1 to about 40 p.p.m.

3. The process of claim 1 in which the weight percent of $P_2O_5$ of the sodium polyphosphate glass is from 68.5 to 69.0%.

References Cited in the file of this patent

UNITED STATES PATENTS

| | | |
|---|---|---|
| 2,174,614 | Bornemann et al. | Oct. 3, 1939 |
| 2,296,716 | Jelen | Sept. 22, 1942 |
| 2,809,158 | Yustick | Oct. 8, 1957 |
| 2,848,299 | Kahler et al. | Aug. 19, 1958 |
| 2,890,928 | Osipowe | June 16, 1959 |
| 2,900,222 | Kahler et al. | Aug. 18, 1959 |
| 2,987,473 | Millman et al. | June 6, 1961 |
| 2,999,732 | Kahler et al. | Sept. 12, 1961 |
| 3,024,201 | Bregman | Mar. 6, 1962 |